United States Patent [19]

Siiberg

[11] 4,156,126

[45] May 22, 1979

[54] CIGAR LIGHTER

[75] Inventor: Hemming G. Siiberg, Summit, N.J.

[73] Assignee: Wagner Electric Corporation, Parsippany, N.J.

[21] Appl. No.: 809,601

[22] Filed: Jun. 24, 1977

[51] Int. Cl.² ............................................... F23Q 7/00
[52] U.S. Cl. .................................... 219/270; 219/265; 219/267
[58] Field of Search ............... 219/260, 261, 262, 263, 219/264, 265, 266, 267, 268, 269, 270

[56] References Cited

U.S. PATENT DOCUMENTS

| 2,531,901 | 11/1950 | Ashton | 219/267 |
| 2,895,036 | 7/1959 | Ashton et al. | 219/267 |
| 3,040,160 | 6/1962 | Gaudet et al. | 219/267 |
| 3,433,928 | 3/1969 | Horwitt | 219/267 |
| 3,462,581 | 8/1969 | Bristol et al. | 219/265 |

Primary Examiner—Bruce A. Reynolds
Assistant Examiner—Susan M. Hoffmann
Attorney, Agent, or Firm—Eyre, Mann, Lucas & Just

[57] ABSTRACT

The plug portion of a cigar lighter is assembled using a decorative disc held in place by the shaft of a knob being threaded into a disc which is secured against protuberances in a cup by a rolled flange.

5 Claims, 2 Drawing Figures

CIGAR LIGHTER

BACKGROUND OF THE INVENTION

The automotive original equipment market for cigar lighters accounts for millions of units per year. A constant search goes on for materials and methods which will reduce the cost by as much as a fraction of a penny.

The plug portion of an automotive cigar lighter conventionally consists of a pair of telescoping hollow tubes with a coil bias spring retained in the annular chamber between them. An inner member having a burner and burner cup at one end, and means for attaching a handle at the other end, occupies the center of the inner member. The burner cup prevents withdrawal of the inner member from the hollow tubes in one direction. Normally a flange at the second end of the inner member prevents withdrawal of the inner member in the second direction from the hollow tubes. U.S. Pat. No. 2,667,562 teaches a cigar lighter with an inner cup having an outward opening cone shape with a seating flange at its end. A disc containing a threaded hole is staked into the end of the inner cup by deforming the cup material into notches in the disc at three points about its perimeter. This assembly method is relatively time consuming because the disc and staking tools must be angularly oriented before affixing the disc. Staked assembly is also shown in U.S. Pat. Nos. 3,040,160 and 2,531,901. U.S. Pat. No. 2,895,036 teaches the use of a disc with a threaded hole placed inside a cup adjacent to a flange staked in place by deforming the metal of the cup inboard of the disc. The knob has a flange which retains the assembly together when a threaded knob shaft is threaded into the threaded hole in the disc.

DETAILED DESCRIPTION OF THE PREFERRED EMBODIMENT

Figure 1:
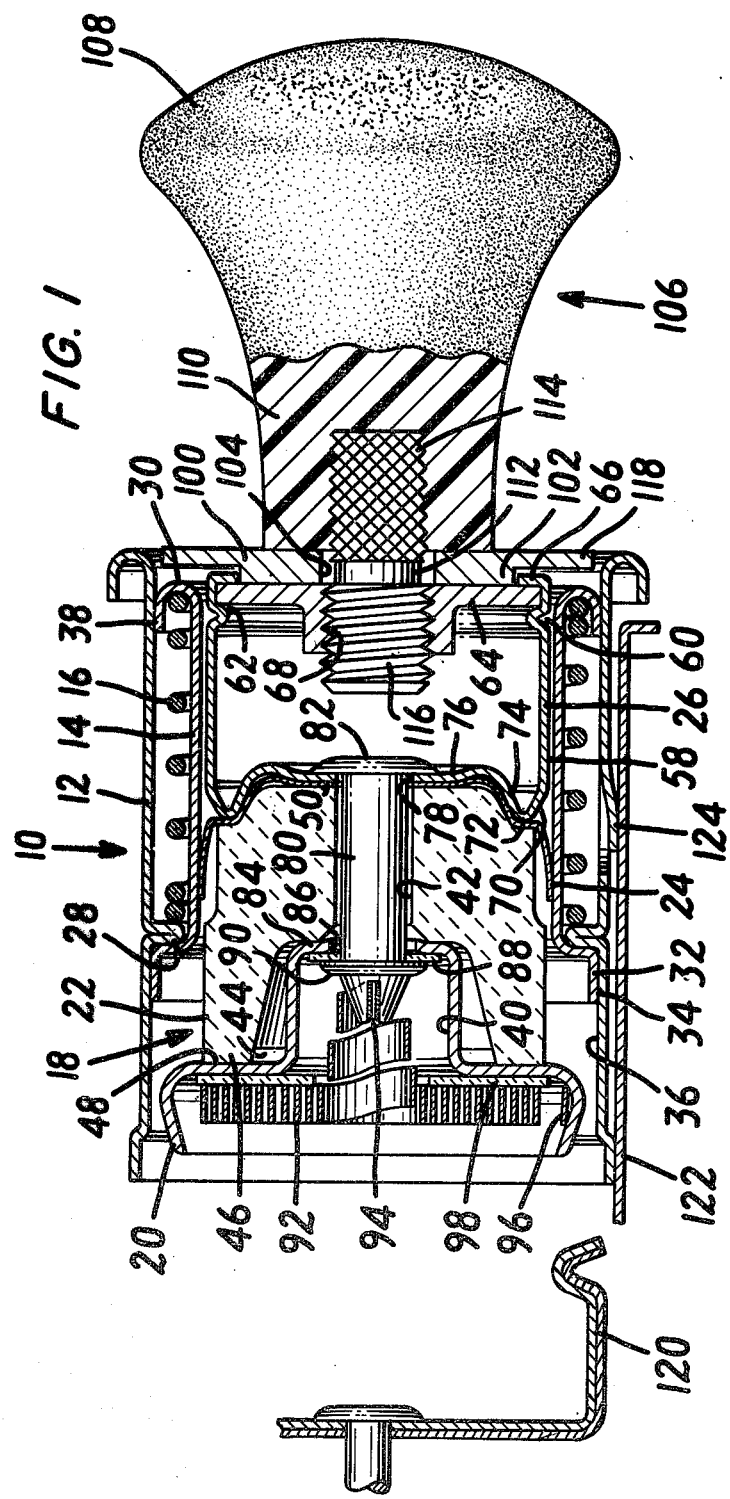
FIG. 1 shows a cross sectional view of an embodiment of the plug of the present invention.

A cigar lighter plug is shown in FIG. 1 generally at 10. The plug 10 is assembled of two major subassemblies which are finally united using the teaching of this invention.

Figure 2:
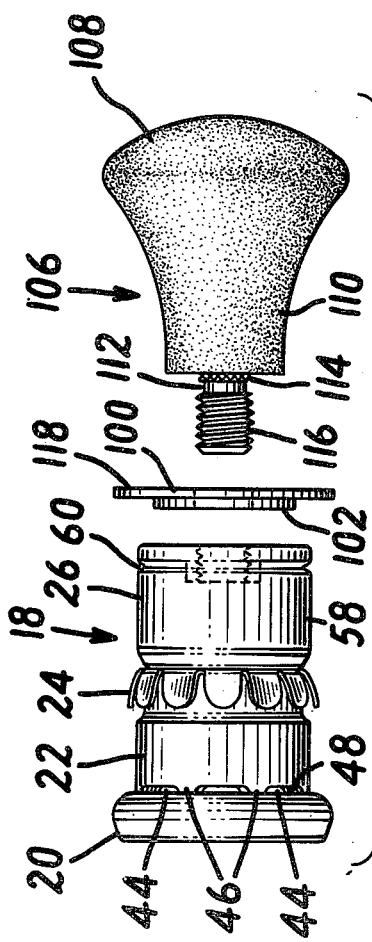
FIG. 2 shows an exploded view of parts of the embodiment of FIG. 1.

An outer barrel 12 and an inner barrel 14 axially biased by a spring 16 forms the first major assembly. The second major subassembly, shown in FIG. 2 at 18 is made up of the burner cup 20, a ceramic sleeve 22, copper contact fingers 24 and metal cup 26 with internal parts which will be detailed later.

Returning now to FIG. 1, the outer barrel 12 contains an annular inward projection 28. The spring 16 bears at one end against the annular inward projection. The inner barrel 14 contains an outward directed U-shaped flange 30. The other end of the spring 16 is retained within the U-shaped flange 30. A flange 32 on the inner barrel on the left side of the annular inward projection limits the extent to which the spring 16 can displace the outer barrel 12 leftwardly and the inner barrel 14 rightwardly. The flange 32 has an annular guiding surface 34 which guidingly fits the outer portion 36 of the outer barrel 12. The U-shaped flange 30 at its outer portion 38 is in guiding fit with the interior of the outer barrel 12.

The burner cup 20 contains an axial recess 40. The ceramic sleeve 22 has an axial bore 42. The end of the ceramic sleeve 22 adjacent the burner cup 20 contains grooves 44 leaving a number of feet 46 which bear against the rear surface 48 of the burner cup 20. The small area of contact between the feet 46 and the burner cup 20 reduces the transmission of heat. In addition, the grooves 44 enable the circulation of air to the interior of the ceramic sleeves 22. The cup 26 contains a cylindrical portion 58 with an annular groove 60 rolled or otherwise formed in the cylindrical portion 58. The annular groove 60 forms an interior ledge 62 which provides a seating surface for a disc-shaped nut 64. A retaining flange is rolled over the perimeter of the disc-shaped nut 64 to securely capture the disc-shaped nut 64 against the interior ledge 62. An axial threaded hole 68 in the disc-shaped nut 64 is located in the center of the disc-shaped nut 64. The annular groove 60 need not extend about the entire circumference of the cup 26. Instead, the annular groove 60 may be replaced with a plurality of inward depressions against which the disc-shaped nut 64 may bear.

The cup 26 is beveled inward at 70 to a V-shaped bearing surface 72.

Radially inward of the V-shaped bearing surface 72, the cup 26 contains a dome-shaped protuberance formed by annular wall 74 and disc-shaped top 76 containing an axial hole 78 therein. A stud 80 passes through the axial hole 78. A riveted head 82 on the stud 80 bears against the disc-shaped top 76.

The axial recess 40 ends in an inward-directed flange 84 having an axial hole 86 therein. The stud 80 passes through the axial hole 86. The axial hole 86 has a diameter larger than the stud 80, thereby permitting the stud 80 to pass through without touching. A disc of insulating material 88, preferably mica is located on the stud 80 inside the axial recess 40. The stud 80 is driven through and held by metal washer 90. The disc of insulating material 88 centralizes the stud 80 within the axial recess 40 and insulates the inward-directed flange 84 from electrical contact with the stud 80 and the metal washer 90. The stud 80 pulls the cup 26 and the burner cup 20 toward each other thus applying axial force which tightly pulls the V-shaped bearing surface 72 into mechanical and electrical contact with the copper disc 50.

A heating coil 92 is electrically connected at its inner end 94 to the stud 80 and at its outer end 96 to the burner cup 20. An insulating disc 98, preferably of mica, electrically insulates the heating coil 92 from the burner cup 20.

The second major subassembly 18 is a sliding fit from the left in FIG. 1 within the inner barrel 14. The springback of the fluted contact fingers 24 provides frictional contact and good electrical connection between the second major subassembly 18 and the inner barrel 14. Rightward motion of the second major subassembly 18 is limited by the abutment of the rim of the burner cup 20 against the inside of the flange 32.

A decorative disc 100 is fitted over the end of the second major subassembly 18 and retains it within the inner and outer barrels 14, 12. The decorative disc 100 has a central boss 102 which fits inside the retaining flange 66 and abuts the disc-shaped nut 64. The decorative disc 100 has an axial hole 104 which is aligned with the axial threaded hole 68 in the disc-shaped nut 64.

A knob assembly 106 is composed of a button 108 and a stem 110, both preferably of moldable plastic material, and a metallic shaft 112. The shaft 112 is embedded in the stem 110 preferably during the molding of the button 108 and stem 110. The bond between the shaft 112 and the stem 110 may be advantageously improved by mechanical roughening the shaft 112 as by the knurling 114. The shaft is threaded at 116 to cooperatively engage the axial threaded hole 68 in the disc shaped nut 64.

The decorative disc 100 has a flange 118 which has a diameter greater than the inner diameter of the inner barrel 14 but smaller than the inner diameter of the outer barrel 12. When assembled as shown in FIG. 1, the decorative disc secures the second major subassembly 18 inside the inner and outer barrels 14, 12.

The details of the socket for use with a lighter are well known in the art and are therefore not shown except for the bimetallic latch 120 and a fragmentary portion of the shell 122.

When the lighter is operated, the knob assembly 106 is pressed inward. The flange 118 of the decorative disc 100 presses inward on the U-shaped flange 30 on the inner barrel 14, thus compressing spring 16 and allowing the second major subassembly 18 to move leftward until the rim of the burner cup 20 deflects the bimetallic latch 120 and finally allows the bimetallic latch 120 to snap into a retaining position beyond the rim of the burner cup 20. Electric current is supplied to the outer end 96 of the heating coil 92 from the bimetallic latch 120 through the burner cup 20. The electric circuit is completed through the inner end 94 of the heating coil 92, the stud 80, the cup 26, the copper disc 50, the contact fingers 24, the inner barrel 14, the spring 16, the outer barrel 12 and the friction finger 124 to the socket shell shown fragmentarily at 122. When the heating coil 92 attains approximately a desired temperature, the adjacent bimetallic latch 120 becomes heated sufficiently to deflect far enough to release the burner cup 20. The spring 16 urges the inner barrel 14 and the remaining parts to return to their positions shown in FIG. 1.

When the plug 10 is to be withdrawn from the socket for use, the frictional retention of the friction finger 124 on the shell 122 provides greater resistance to motion than the frictional resistance between the second major subassembly 18 and the inner barrel 14. Other elements (not shown) may also add frictional resistance. Therefore the second major subassembly 18 slides axially toward the right until the burner cup 20 abuts the flange 32. This action retracts the heating coil 92 into a hooded position within the outer barrel 12. The hooded position of the heating coil 92 is a safety feature which helps prevent accidental contact with the heating coil 92 and also reduces the risk that hot ashes will fall on the user. Additional outward force on the knob assembly 106 overcomes the frictional retention of the friction finger 124 on the socket. The plug 10 thereupon is withdrawn from the socket.

It will be understood that the claims are intended to cover all changes and modifications of the preferred embodiments of the invention, herein chosen for the purpose of illustration which do not constitute departures from the spirit and scope of the invention.

What is claimed is:

1. In a plug for a cigar lighter of the type having telescoping inner and outer cylindrical barrels relatively biased axially apart by a spring, means for limiting the axial extension of said inner and outer cylindrical barrels, a second major subassembly slideable into one end of said inner cylindrical barrel, said second major subassembly having heating means in a first end thereof, and means on said first end to abut a first end of said inner cylindrical barrel, the improvement comprising:
   (a) a metal cup at the second end of said second major subassembly;
   (b) a nut adapted to fit within said metal cup;
   (c) protuberance means within said metal cup for supporting engagement with said nut;
   (d) an inwardly rolled rim on said cup, said inwardly rolled rim capturing said nut between itself and said protuberance means;
   (e) said nut having a hole therein;
   (f) a decorative disc having a hole therein adapted to abut said nut and to overlap the second end of said inner cylindrical barrel;
   (g) a handle;
   (h) threaded means for attaching said handle through the hole in said decorative disc to said nut holding said decorative disc in abutment with said nut; and
   (i) said disc holding said second major subassembly in said telescoping inner and outer cylindrical barrel and said second major subassembly being removeable upon detaching said handle and decorative disc.

2. The apparatus in claim 1 further comprising:
   (a) said nut being disc-shaped and having a threaded hole axially disposed therein;
   (b) said handle having a threaded shaft protruding therefrom; and
   (c) said threaded shaft passing through the hole in said decorative disc and into threaded engagement with said threaded hole.

3. The apparatus in claim 1 further comprising said protuberance means being an annular groove about substantially the entire perimeter of said metal cup.

4. A cigar lighter plug comprising:
   (a) an outer member;
   (b) an inner member;
   (c) said inner member being slideable within said outer member;
   (d) burner means at a first end of said inner member;
   (e) means on said burner means for mechanically interfering with said outer member to prevent withdrawal of said inner member from said outer member in a first direction;
   (f) threaded means at the second end of said inner member;
   (g) a disc abutting said threaded means said disc having a hole therein;
   (h) a handle;
   (i) said handle having a threaded shaft attached thereto;
   (j) said threaded shaft passing through said hole and threadably engaging said threaded means whereby said disc is retained in abutment with said threaded means; and
   (k) said disc interfering with said outer member to prevent withdrawal of said inner member from said outer member in a second direction and said inner member being removable from said outer member by disengaging said threaded shaft from said threaded means.

5. The apparatus in claim 4 wherein said threaded means comprises:
   (a) a disc-shaped nut;
   (b) a metal cup on said inner member;
   (c) depression means for supporting said disc-shaped nut in said metal cup; and
   (d) a flange on said metal cup overlapping at least part of the perimeter of said disc-shaped nut.

* * * * *